United States Patent [19]

Kawasaki et al.

[11] Patent Number: 5,230,756
[45] Date of Patent: Jul. 27, 1993

[54] METHOD OF FORMING WELD BEAD OF PURE COPPER ON FERROALLOY BASE MATERIAL

[75] Inventors: Minoru Kawasaki; Soya Takagi, both of Toyota; Shinji Kato, Aichi; Kazuhiko Mori, Toyota; Yasuo Kotetsu, Kariya, all of Japan

[73] Assignees: Toyota Jidosha Kabushiki Kaisha; Kabushiki Kaisha Toyoda Jidoshokki Seisakusho, Japan

[21] Appl. No.: 680,062

[22] Filed: Apr. 3, 1991

[30] Foreign Application Priority Data

Apr. 6, 1990 [JP] Japan ................................ 2-92796

[51] Int. Cl.⁵ .................. B05D 3/06; B23K 15/00; B23K 9/00; B23K 26/00
[52] U.S. Cl. ........................ 148/522; 148/524; 148/525; 148/529; 148/532; 148/536; 427/556; 427/597; 427/540; 427/580; 219/121.17; 219/121.59; 219/121.66
[58] Field of Search ........... 427/53.1, 35, 37, 556, 427/597, 540, 580; 219/121.14, 121.16, 121.17, 121.38, 121.46, 121.47, 121.59, 121.64, 121.66; 148/522, 524, 525, 529, 532, 536

[56] References Cited

U.S. PATENT DOCUMENTS 2,427,517  9/1947  Wilson et al. .................. 29/165.55
4,267,241  5/1981  Mahrus et al. .................. 148/524
4,818,307  4/1989  Mori et al. .................... 148/414
4,832,982  5/1989  Mori et al. .................... 427/53.1

FOREIGN PATENT DOCUMENTS 0221752   5/1987  European Pat. Off. .
0344310  12/1989  European Pat. Off. .
62-101392 5/1987  Japan .

OTHER PUBLICATIONS

Welding Production, 31(1984)Jul., No. 7, Cambridge, Great-Britain "Plasma-electroslag Deposition of Copper on Steel", (2 pages).
English Abstract of Japanese Patent Application No. 58-89262, vol. 9, No. 87, (M-372) (1810), Apr. 17, 1985.

Primary Examiner—Marianne Padgett
Attorney, Agent, or Firm—Finnegan, Henderson, Farabow, Garrett & Dunner

[57] ABSTRACT

In forming a weld bead of pure copper on a ferroalloy base material by laying a powder of copper and melting the powder by a high density energy source such as laser beams, TIG arc or electron beams, the powder of copper is beforehand mixed with a powder of an auxiliary metal having a higher melting point than pure copper. In order to ensure the substantial purity in copper of the weld bead, the powder mixture should not include more than 16 wt % nickel.

11 Claims, 8 Drawing Sheets

METHOD OF FORMING WELD BEAD OF PURE COPPER ON FERROALLOY BASE MATERIAL

BACKGROUND OF THE INVENTION

1. Field of the Invention

The present invention relates to a method of forming a weld bead of metal, and more particularly a method of forming a weld bead of pure copper on a ferroalloy base material.

2. Description of the Prior Art

It is already known to provide a coating membrane of copper or a copper alloy on the surface of a cast iron material and thereafter to melt the coating membrane by a high density energy source so as thereby to turn the coating membrane into a weld bead, as disclosed, for example, in Japanese Patent Laid-open Publication 62-101392. According to this method it is possible to obtain a weld bead having no cracks or blow holes.

However, when this method is used for copper in such a manner that a powder of pure copper is laid on the surface of a cast iron material and the powder is melted by a high density energy source in order to form a weld bead of pure copper on the cast iron material, the graphite in the cast iron diffuses into the coating membrane, and therefore a weld bead having a high copper content can not be formed on the base material.

As a result of various experimental research efforts for forming a weld bead of pure copper on a cast iron material in view of the above-mentioned problem, the inventors of the present application have succeeded in forming a weld bead having a high copper content on a ferroalloy base material by mixing a powder of pure copper with a powder of an auxiliary metal which satisfies certain particular conditions.

SUMMARY OF THE INVENTION

Therefore, it is the object of the present invention to provide a method of forming a weld bead having high copper content on a ferroalloy base material.

According to the present invention, such an object is accomplished by a method of forming a weld bead of pure copper on a ferroalloy base material comprising the steps of laying a mixture of a powder of pure copper and a powder of an auxiliary metal having a higher melting point than pure copper, said powder mixture including not more than 16 wt % nickel, and melting said powder mixture by a high density energy source.

According to the present invention a powder of pure copper is mixed with a powder of an auxiliary metal having a higher melting point than pure copper to provide a powder mixture in which the nickel content is not more than 16 wt %, and then the powder mixture is laid on a ferroalloy base material and is melted by a high density energy source.

As a molten metal formed by melting of the powder mixture is principally cooled down by heat conduction to the ferroalloy base material, the solidification of the molten metal starts at a portion thereof defining a border contacting the base material. Since the auxiliary metal has a higher melting point than pure copper, the auxiliary metal starts to solidify prior to pure copper, thereby forming a solidified layer of the auxiliary metal on the surface of the base material before the pure copper in the mixture solidifies on the solidified layer of the auxiliary metal, thereby maintaining a high purity copper content.

The nickel content of the powder mixture has the effect of improving the tightness and tenacity of the layer substantially formed from the auxiliary metal and the integrity of such an intermediate layer with the principal body of the weld bead. Since the content of the nickel which is co-solidifiable with copper at any rate is not more than 16 wt %, it is avoided that the purity of copper of the weld bead is substantially affected by the nickel in the mixture being retained in the body of the weld bead, as will be appreciated by the results of the experimental research conducted by the inventors and described hereinunder. The minimum amount of the nickel content to obtain the above-mentioned effects is not critically determined. However, it is desirable that the nickel content is not less than 4 wt %.

According to the experimental research conducted by the inventors, it is possible to obtain a weld bead having a very high purity of copper when the nickel content is not higher than 15 wt %, particularly not higher than 13 wt %. Therefore, according to a detailed feature of the present invention, the nickel content of the powder mixture is set to be not more than 15 wt %, more desirably not more than 13 wt %.

Further, according to the results of the experimental research conducted by the inventors, the weld bead is liable to cracking when the content of pure copper of the powder mixture is less than 60 wt %, particularly less than 50 wt %, whereas the efficiency of welding of the powder mixture to the base material is lowered when the content of pure copper of the powder mixture is more than 90 wt %, particularly more than 95 wt %. Therefore, according to another detailed feature of the present invention, the copper content of the powder mixture is set to be 50-95 wt %, more desirably 60-90 wt %.

Further, according to the results of the experimental research conducted by the inventors, when laser beams are used for the high density energy source, it is desirable that the powder of the auxiliary metal includes B, Si or C, wherein it is desirable that the total amount of these elements in the powder mixture is 0.5-7.5 wt %, particularly 1.0-5.0 wt %. Therefore, according to a further detailed feature of the present invention, the total content of B, Si and C of the powder mixture is set to be 0.5-7.5 wt %, more desirably 1.0-5.0 wt %.

Further, according to the results of the experimental research conducted by the inventors, it is desirable that the solubility of the metal elements forming the auxiliary powder to copper at room temperature is not more than 0.5 wt %. Therefore, according to a further detailed feature of the present invention, the metal elements forming the auxiliary powder are selected so that the solubility thereof to copper at room temperature is not more than 0.5 wt %.

The high density energy source for the method according to the present invention may be laser beams, TIG arc or electron beams. Laser beams are more widely usable than other high density energy sources when the electric resistance of the powder mixture or the base material is relatively high and are superior to others in adjustability of focus so that the range of heating applied to the powder mixture is relatively easily controlled. TIG arc and electron beams are superior to laser beams in that the molten metal generated from the powder mixture is agitated by the electromagnetic effect. While the environment for electron beams should generally be a vacuum, an inert gas atmosphere may be used for laser beams and TIG arcs, allowing for higher efficiency of work with less equipment than electron beams. Electron beams are superior to the others when a very small area is to be heated.

The powder mixture may simply be laid on the surface of the base material beforehand, or, when laser beams or electron beams are used for the high density energy source, the powder mixture may be successively supplied onto the surface of the base material along the line of scanning of the laser or electron beams as they proceed.

BRIEF DESCRIPTION OF THE DRAWINGS

In the accompanying drawings.

DESCRIPTION OF THE PREFERRED EMBODIMENTS

In the following the present invention will be described in more detail in the form of some preferred embodiments with reference to the accompanying drawings.

Embodiment 1

First, a pure copper powder having an average particle size of 74 microns and a melting point of 1083° C. and a powder of the auxiliary metal were prepared, wherein the auxiliary metal was "FP230" manufactured by Fukuda Kinzoku Kabushiki Kaisha and having an average particle size of 74 microns and a melting point of 1220° C. and including 15 wt % Ni, 19.5 wt % Cr, 0.5 wt % B, 3.8 wt % Si, 0.1 wt % C, 2.8 wt % W, 1.0 wt % Mn, 0.5 wt % Mo, 2.5 wt % Co and remainder Fe. These powders were mixed with one another at a ratio by weight of 80 vs. 20.

Figure 1:
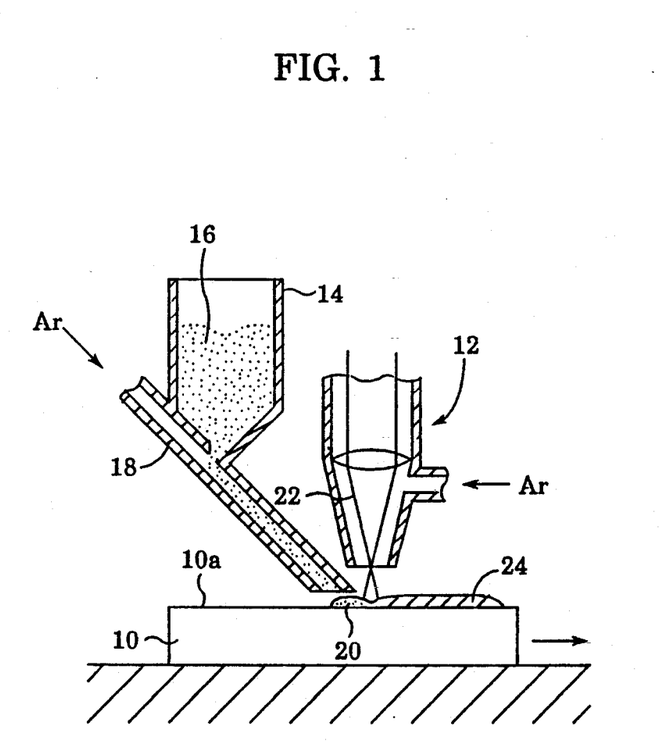
FIG. 1 is a sectional view showing a manner of forming a weld bead according to an embodiment of the method of the present invention.

On the other hand, as shown in FIG. 1, a base material 10 of a size of 70×70×5 mm made of carbon steel (Japanese Industrial Standard S45C) was positioned below a laser gun 12 and a powder feed hopper 14, and then the powder mixture was charged as indicated by 16 into the hopper. Then, while ejecting an assist gas from the tip of the laser gun 12 and supplying argon as a carrier gas through a conduit 18, the powder mixture was continually supplied onto a center line portion of the surface 10a of 70×70 mm of the base material 10 which was moved rightward in the figure, so that a powder layer 20 was formed thereon and irradiated by laser beams 22 to be melted into a form of molten weld bead 24 according to the conditions described below. The molten weld bead and the surface portion of the base material were rapidly cooled down by the heat thereof being absorbed by the body portion of the base material.

Table 1

Power: 4 kw
Rate of forming beams: 500 mm/min
Oscillation amplitude of beams: 7 mm
Defocus: 20 mm
Assist gas: argon (10 l/min)

Figure 2:
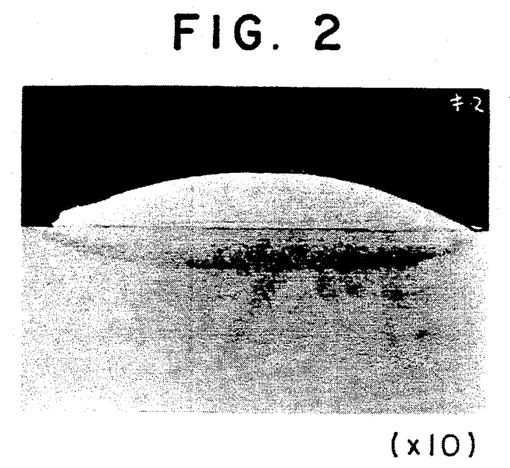
FIG. 2 is an optically microscopic photograph showing the metallurgical structure in a cross section of the weld bead formed on the base material of carbon steel taken in a direction perpendicular to the direction of extension of the weld bead as magnified 10 times.

FIG. 2 is an optically microscopic photograph showing the metallurgical structure in a cross section of the weld bead taken in a direction perpendicular to the direction of extension of the weld bead as magnified 10 times. In FIG. 2, the white portion in the weld bead adjoining the base material is formed of the auxiliary metal, and the bright portion thereabove is principally made of pure copper. From FIG. 2 it will be appreciated that the weld bead is formed in good condition.

Figure 3:
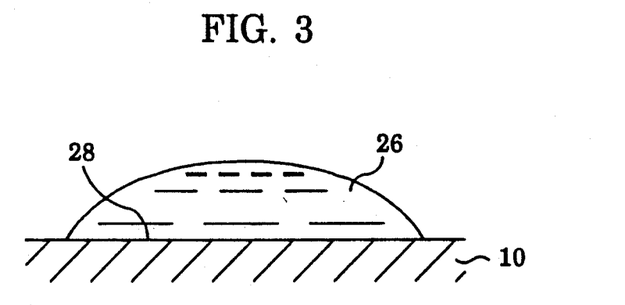
FIGS. 3, 4 and 5 are illustrations of the solidifying process of the molten metal according to the method of the present invention.
Figure 4:
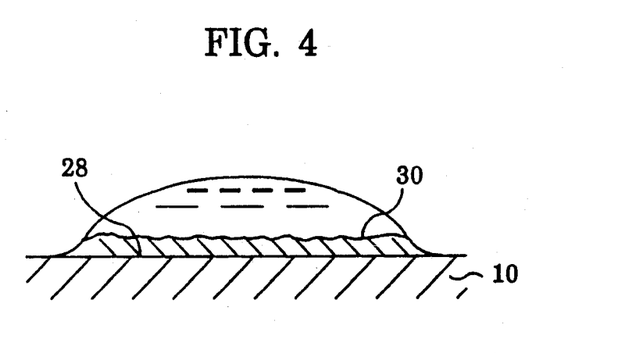
Figure 5:
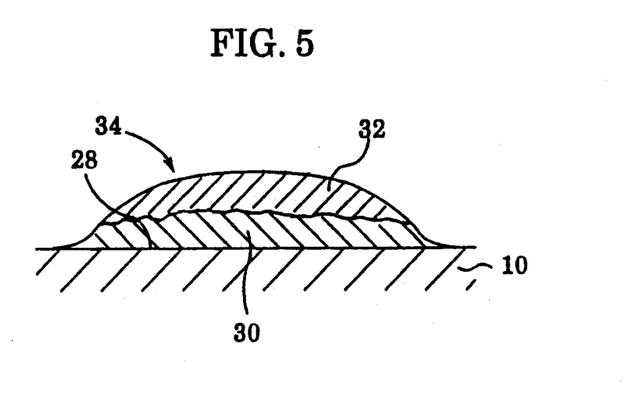

It is considered that such a result was obtained through a solidifying process of the molten metal generated by melting of the powder mixture as illustrated in FIGS. 3 to 5. Referring to these figures, when the metals of the powder mixture are in a completely molten state as shown in FIG. 3, the pure copper and the auxiliary metal are substantially mixed with one another. However, since the molten metal 26 is cooled down principally by the conduction of heat to the base material, the solidification of the molten metal starts at a border 28 contacting the base material. Since the auxiliary metal has a higher melting point than pure copper, the auxiliary metal starts to solidify prior to pure copper. Therefore, a layer 30 of the solidified auxiliary metal is formed as shown in FIG. 4, before copper solidifies to form a layer 32 on the layer 30 of the auxiliary metal as shown in FIG. 5, so that a double layered weld bead structure having the auxiliary metal layer 30 and the copper layer 32 is finally obtained.

Embodiment 2

Figure 6:
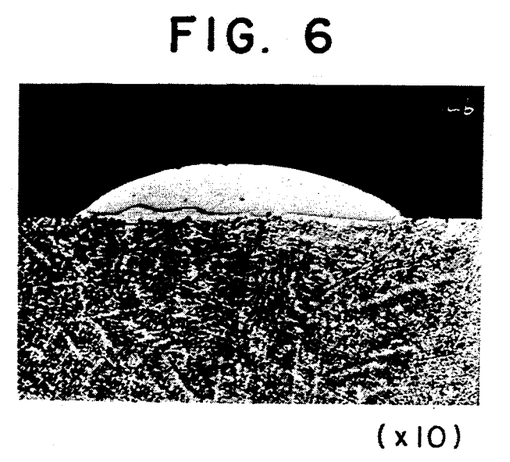
FIG. 6 is an optically microscopic photograph showing the metallurgical structure in a cross section of the weld bead formed on the base material of a cast iron taken in a direction perpendicular to the direction of extension of the weld bead as magnified 10 times.
Figure 7:
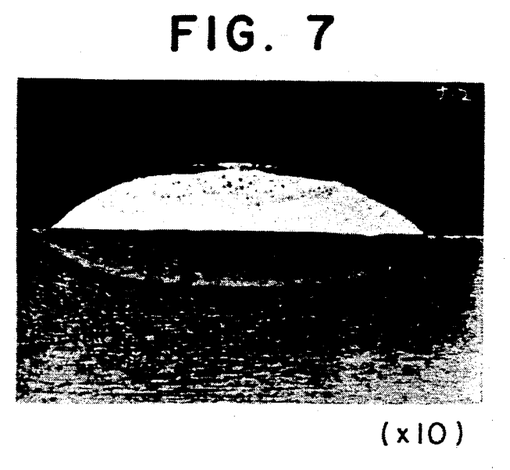
FIGS. 7, 8, 9, 10, 11, 12, 13, 14 and 15 are optically microscopic photographs showing the metallurgical structures in cross section of the weld beads formed by varying the mixing ratio among pure copper powder and two kinds of auxiliary metals taken in a direction perpendicular to the direction of extension of the weld bead as magnified 10 times.
Figure 8:
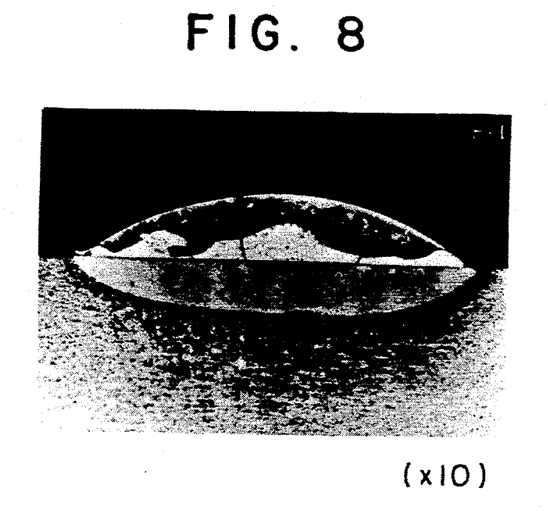
Figure 9:
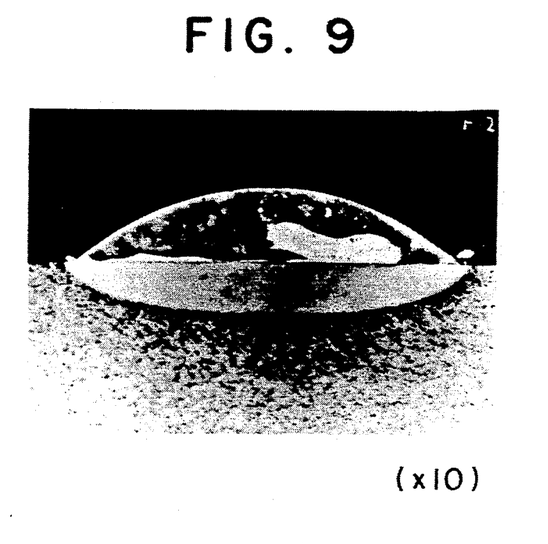
Figure 10:
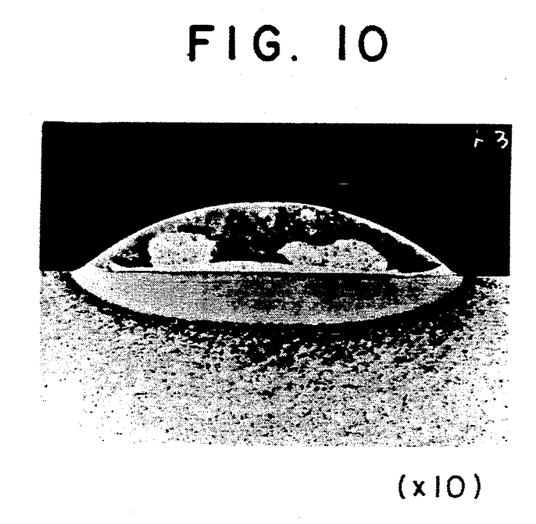
Figure 11:
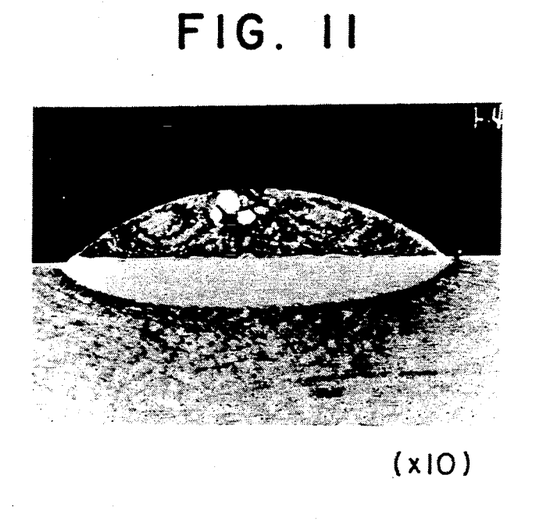
Figure 12:
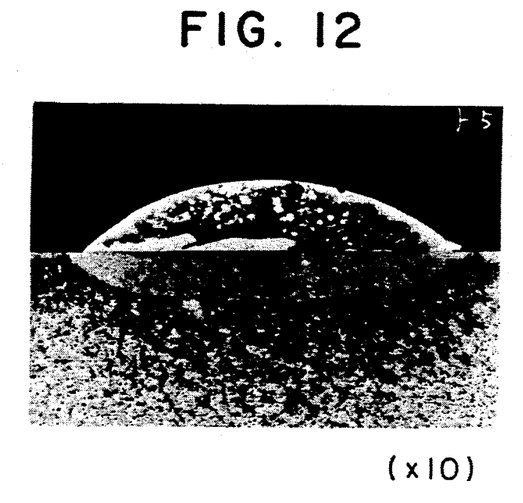
Figure 13:
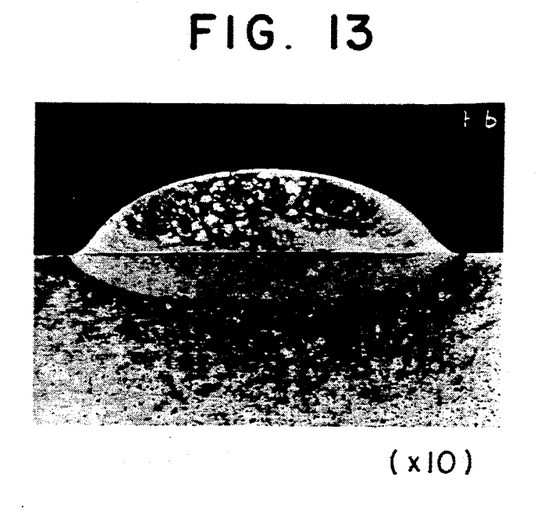
Figure 14:
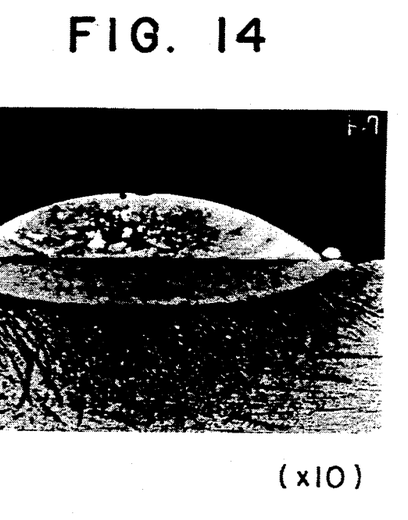
Figure 15:
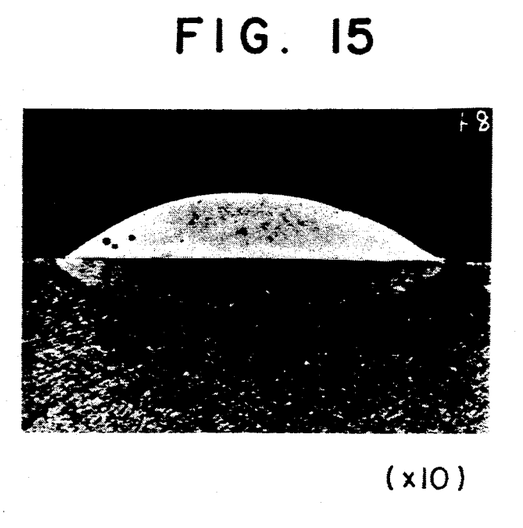

Another weld bead was formed in the same manner and under the same conditions as in Embodiment 1, except that cast iron (Japanese Industrial Standard FC23) was used for the base material. FIG. 6 is an optically microscopic photograph showing the metallurgical structure in a cross section of the weld bead taken in a direction perpendicular to the direction of extension of the weld bead thus obtained as magnified 10 times. From FIG. 6 it will be appreciated that weld bead was also formed in good condition when the base material is a cast iron so as to include a layer of the auxiliary metal adjoining the base material and a layer of pure copper formed thereon.

EXAMPLE 1

By using the same powder of pure copper and the powder of "FP230" as used in Embodiment 1, and further a powder of "FP430" also manufactured by Fukuda Kinzoku Kabushiki Kaisha and having an average particle size of 74 microns, a melting point of 1260° C. and a composition of 15 wt % Cr, 2 wt % W, 0.3 wt % C, 5 wt % Fe, 0.7 wt % B, 5 wt % Si and remainder Ni, nine powder mixtures numbered No. 1 to 9 were prepared at mixing ratios as shown in Table 2;

TABLE 2

| No. | Mixing ratio | | | Ni content wt % | Melting point °C. |
|---|---|---|---|---|---|
| | FP230 | FP430 | Cu | | |
| 1 | 18 | 2 | 80 | 4.1 | 1220–1230 |
| 2 | 45 | 5 | 50 | 10.4 | 1220–1230 |
| 3 | 40 | 10 | 50 | 13.2 | 1220–1230 |
| 4 | 35 | 15 | 50 | 16.1 | 1220–1240 |
| 5 | 30 | 20 | 50 | 19.9 | 1220–1240 |
| 6 | 25 | 25 | 50 | 21.8 | 1230–1250 |
| 7 | 20 | 30 | 50 | 24.6 | 1240–1260 |
| 8 | 15 | 35 | 50 | 27.5 | 1240–1260 |
| 9 | 10 | 40 | 50 | 30.3 | 1240–1260 |

Then, by using these powder mixtures weld beads were formed in the same manner and under the same conditions as in Embodiment 1. FIGS. 7-15 are optically microscopic photographs showing the metallurgical structures in cross sections of the weld beads thus obtained corresponding to powder mixture Nos. 1-9 taken in a direction perpendicular to the direction of extension of each of the weld beads as magnified 10 times. In these photographs, the white or bright grey portions are principally made of the auxiliary metals and the black or dark grey portions are principally made of copper.

From these photographs it will be appreciated that the nickel content of the powder mixture should desirably be not more than 16 wt %, more desirably not more than 13 wt %.

Figure 16:
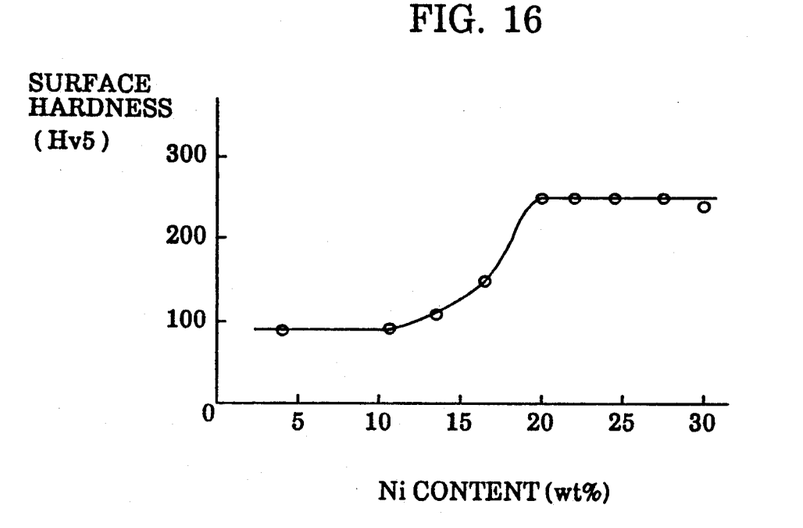
FIG. 16 is a graph showing the relation between the nickel content of the powder mixture and the surface hardness of the weld bead.

The Vicker's hardness Hv under the load of 5 kg was measured with respect to the surface portions of the weld beads. The results are shown in FIG. 16. From this figure it will be appreciated that when a weld bead having high purity of copper is to be formed on a carbon steel, the nickel content of the powder mixture should desirably be not more than 16 wt %, more desirably not more than 15 wt %, and further more desirably not more than 13 wt %.

There is an inverse relation between the hardness and the purity of copper of the surface portion of the weld bead. In other word, the hardness is lower as the purity of copper is higher. Therefore, it is possible to estimate the purity of copper of the surface portion of the bead from measurement of the hardness thereof.

EXAMPLE 2

Weld beads were formed in the same manner and under the same conditions as in Embodiment 1, except that the pure copper powder and the "FP230" powder were mixed in various mixing ratios. Then, a cracking rate was measured as the number of cracks generated in 1 cm² cross section of the weld bead, and an efficiency of welding of the powder material to the base material was measured as a ratio of the weight of the weld bead formed on the base material to the weight of the powder mixture supplied to form the weld bead. The results are shown in FIG. 17.

Figure 17:
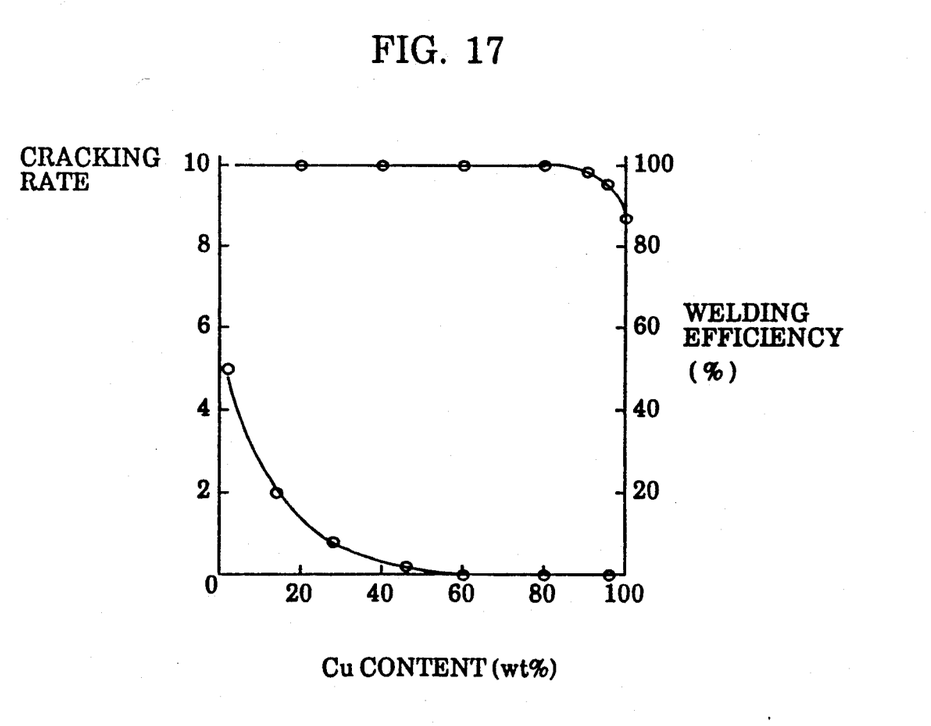
FIG. 17 is a graph showing the relation between the copper content of the powder mixture and the cracking rate of the weld bead and the efficiency of welding of the powder mixture to the base material.

From FIG. 17 it will be appreciated that the copper content of the powder mixture should desirably be not less than 40 wt %, more desirably not less than 50 wt %, in order to avoid cracking of the weld bead, and that the copper content of the powder mixture should desirably be not more than 95 wt %, more desirably not more than 90 wt %, in order to obtain high efficiency of welding of the powder mixture to the base material.

Further, it was also confirmed that, when the base material in Examples 1 and 2 was replaced by cast iron (Japanese Industrial Standard FC23), substantially the same results were obtained. Further, it was also confirmed that, when the auxiliary metal in Example 2 was replaced by "FP430" used in Example 1, substantially the same results as shown in FIG. 17 were obtained.

As will be apparent from the foregoing, the molten metal formed by melting of the powder mixture starts to solidify at a portion thereof adjoining the base material. Since the auxiliary metal in the molten metal has a higher melting point than pure copper, the auxiliary metal starts to solidify prior to pure copper so as first to form a solidified layer of the auxiliary metal adjacent the base material, before the remaining copper solidifies to form a solidified layer thereof on the layer of the solidified auxiliary metal. Since the content of nickel which is co-solidifiable with copper at any rate is set to be not more than 16 wt %, it is avoided that the purity of copper of the layer finally solidified lowers by mixing of the nickel therein.

Therefore, according to the present invention it is possible to obtain a weld bead having a double layer structure having a layer of the auxiliary metal formed adjacent the base material and a copper layer having high copper content formed thereon.

Although the present invention has been described in detail with respect to some embodiments thereof in the above, it will be understood by those skilled in the art that various other embodiments are possible within the scope of the present invention.

We claim:

1. A method of forming a weld bead on a carbon-containing ferroalloy base material, with said weld bead having a copper component, said method comprising laying a powder mixture comprising pure copper and an auxiliary metal or alloy including at least nickel in an amount not exceeding 16 wt. %, with said auxiliary metal or alloy having a higher melting point than pure copper and being weldable to said ferroalloy base material, thereafter melting said powder mixture by an energy source to form a melt therefrom and cooling said melt to form said weld bead at a cooling rate at which said auxiliary metal or alloy forms a solidified layer in contact with said ferroalloy base material prior to solidification of said copper component to prevent diffusion of carbon from said ferroalloy base material to said copper component prior to solidification thereof, whereby contamination of said weld bead by carbon diffusion from the ferroalloy base material is avoided.

2. A method according to claim 1, wherein a nickel content of the powder mixture is not more than 15 wt %.

3. A method according to claim 1, wherein a nickel content of the powder mixture is not more than 13 wt %.

4. A method according to claim 1, wherein a nickel content of the powder mixture is not less than 4 wt %.

5. A method according to claim 1, wherein the copper content of the powder mixture is 50-95 wt %.

6. A method according to claim 1, wherein the copper content of the powder mixture is 60-90 wt %.

7. A method according to claim 1, wherein a total content of B, Si and C of 0.5-7.5 wt % is included in the powder mixture.

8. A method according to claim 7, wherein the total content of B, Si and C of the powder mixture is 1.0–5.0 wt %.

9. A method according to claim 1, wherein any metal element constituting the auxiliary powder is selected so that the solubility thereof in copper at room temperature is not more than 0.5 wt %.

10. A method according to claim 1, wherein the density energy source is selected from laser beams, Tungsten inert gas arc and electron beams.

11. A method according to claim 10, wherein when laser beams or electron beams are used for the density energy source, the powder mixture is successively supplied onto the surface of the base material along a line of scanning of the laser or electron beams as said beams proceed.

* * * * *